United States Patent
Dean et al.

(10) Patent No.: US 6,604,174 B1
(45) Date of Patent: Aug. 5, 2003

(54) PERFORMANCE BASED SYSTEM AND METHOD FOR DYNAMIC ALLOCATION OF A UNIFIED MULTIPORT CACHE

(75) Inventors: Alvar A. Dean, Groton, MA (US); Kenneth J. Goodnow, Essex Junction, VT (US); Stephen W. Mahin, Underhill, VT (US); Wilbur D. Pricer, Charlotte, VT (US); Dana J. Thygesen, Monkton, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 09/709,872

(22) Filed: Nov. 10, 2000

(51) Int. Cl.$^7$ .............................................. G06F 12/00
(52) U.S. Cl. ........................ 711/131; 711/118; 711/128; 711/149; 711/154
(58) Field of Search ................................ 711/130, 131, 711/3, 118, 149, 154, 128

(56) References Cited

U.S. PATENT DOCUMENTS

| | | | |
|---|---|---|---|
| 5,247,649 A | * 9/1993 | Bandoh | 711/130 |
| 5,274,790 A | 12/1993 | Suzuki | 711/133 |
| 5,325,504 A | 6/1994 | Tipley et al. | 711/128 |
| 5,325,511 A | 6/1994 | Collins et al. | 711/128 |
| 5,357,623 A | 10/1994 | Megory-Cohen | 711/129 |
| 5,557,768 A | * 9/1996 | Braceras et al. | 711/131 |
| 5,696,935 A | 12/1997 | Crochowski et al. | 711/125 |
| 5,752,255 A | 5/1998 | Jarvis | 711/3 |
| 5,781,924 A | * 7/1998 | Zaitzeva et al. | 71/131 |
| 5,809,537 A | 9/1998 | Itskin et al. | 711/146 |
| 6,038,647 A | * 3/2000 | Shimizu | 711/129 |
| 6,081,868 A | * 6/2000 | Brooks | 711/3 |
| 6,205,519 B1 | * 3/2001 | Aglietti et al. | 711/133 |

* cited by examiner

Primary Examiner—Reginald G. Bragdon
Assistant Examiner—Jasmine Song
(74) Attorney, Agent, or Firm—Schmeiser, Olsen & Watts; Richard A. Henkler (57) ABSTRACT

The present invention provides a performance based system and method for dynamic allocation of a unified multiport cache. A multiport cache system is disclosed that allows multiple single-cycle look ups through a multiport tag and multiple single-cycle cache accesses from a multiport cache. Therefore, multiple processes, which could be processors, tasks, or threads can access the cache during any cycle. Moreover, the ways of the cache can be allocated to the different processes and then dynamically reallocated based on performance. Most preferably, a relational cache miss percentage is used to reallocate the ways, but other metrics may also be used.

16 Claims, 9 Drawing Sheets

PERFORMANCE BASED SYSTEM AND METHOD FOR DYNAMIC ALLOCATION OF A UNIFIED MULTIPORT CACHE

BACKGROUND OF THE INVENTION

1. Technical Field

This invention generally relates to cache circuits, and more specifically relates to a performance based system and method for dynamic allocation of a unified multiport cache.

2. Background Art

The major driving force behind computer system innovation has been the demand by consumers for faster and more powerful computers. One of the major hurdles for increasing the speed of the computer has historically been the speed with which data can be accessed from memory, often referred to as the memory access time. The microprocessor, with its relatively fast processor cycle times, has generally been delayed during main memory accesses to account for the relatively slow main memory access times. Accordingly, improvement in memory access times has been one of the major areas of research for increasing the speed of the computer.

One such development that has resulted from the research is the use of cache memory. A cache is a small amount of very fast and expensive memory that is used to store a copy of frequently accessed information. By combining the use of fast but expensive cache memory with the slower but cheaper main memory, the overall memory access can be significantly reduced yet the cost remain relatively low. When the processor requests data from main memory and the data resides in the cache, then a cache read hit takes place, and the data from the memory access can be returned to the processor from the cache with minimal wait states. If the data does not reside in the cache, then a cache read miss occurs. In a cache read miss, the memory request is forwarded to the system, and the data is retrieved from main memory, as would normally occur in a system not having a cache. On a cache miss, the data that is retrieved from main memory is provided to the processor and is also written into the cache according to the statistical likelihood that this data will be requested again by the processor.

Important considerations for determining cache performance are the organization of the cache and the cache management policies that are employed in the cache. In general, a cache can be organized into either a direct-mapped or set-associative configuration. In a direct-mapped organization, the physical address space of the computer is conceptually divided into a number of equal pages, with the page size equaling the size of the cache. The cache is partitioned into a number of sets, with each set having a certain number of lines. The line size is usually on the order of a magnitude of 16–128 bytes or more. Each one of the conceptual pages defined in main memory has a number of lines equivalent to the number of lines in the cache, and each line from a respective page in main memory corresponds to a similarly located line in the cache.

An important characteristic of a direct-mapped cache is that each memory line, from a conceptual page defined in main memory, can only reside in the equivalently located line or page offset in the cache. Due to this restriction, the cache only need refer to a certain number of the upper address bits of a memory address, referred to as a tag, in order to determine if a copy of the data from the respective memory address resides in the cache because the lower order address bits are pre-determined by the page offset of the memory address.

A set-associative cache includes a number of banks, or ways, of memory that are each equivalent in size to a conceptual page defined in main memory. Accordingly, a page offset in main memory can be mapped to a number of locations in the cache equal to the number of ways in the cache. For example, in a four-way set-associative cache, a line or page offset from main memory can reside in the equivalent page offset location in any of the four ways of the cache. As with a direct-mapped cache, each of the ways in a multiple way cache is partitioned into a number of sets each having a certain number of lines. In addition, a set-associative cache usually includes a replacement algorithm such as a Least Recently Used (LRU) algorithm, which determines which bank or way with which to fill data when a read miss occurs.

Cache management is usually performed by a device referred to as a cache controller. One such cache management duty performed by a cache controller is the management of processor writes to memory. Typically, the cache controller includes a directory which holds an associated entry for each set in the cache. In a write-through cache, this entry has at least two components: a tag and a tag valid bit. The tag acts as a main memory page number, and it holds the upper address bits of the particular page in main memory from which the copy of data residing in the respective set of the cache originated. The status of the tag valid bit determines whether the data in the respective set of the cache is considered valid or invalid. If the tag valid bit is clear, then the entire set is considered invalid. If, however, the tag valid bit is true, then an individual line within the set is considered valid or invalid depending on the status of its respective line valid bit.

In a write-back cache, the entries in the cache directory are comprised of a tag and a number of tag state bits for each of the lines in each set. As before, the tag comprises the upper address bits of the particular page in main memory from which the copy originated. The tag state bits determine the status of the data for a respective line, i.e., whether the data is invalid, exclusively owned and modified, exclusively owned and unmodified, or shared.

In the future, the ability to support multithreaded applications, or a number of processors, accessing the cache on the same cycle will become common. Since these threads/processors will be accessing different cache lines on the same cycle, serious bandwidth problems could exist in the standard unified cache of today.

Currently, there are two primary architectures for multiple processors. The first is for each processor to have a local cache; the second is for a secondary cache between the processors and the main memory. The latter type of cache is referred to as a "unified" cache. With a unified cache, a processor requesting data queries the secondary cache over a common memory bus after gaining control of that bus.

This scheme has several drawbacks. First, the main memory bus is shared between the processors, meaning that only a single request can be honored at a time. Also, multiple cache look ups can create a bottleneck. The individual processor may not be able to handle several lines of information at a time. Moreover, the amount of cache space set aside for each processor in these systems is usually fixed.

Thus, the most prevalent unified caches allow only single requests, can have cache access bottlenecks, and have fixed cache space per processor. What is needed is a system that solves these problems.

DISCLOSURE OF THE INVENTION

The preferred embodiments of the present invention provide a performance based system and method for dynamic allocation of a unified multiport cache. A multiport cache system is disclosed that allows multiple single-cycle look ups through a multiport tag and multiple single-cycle cache accesses from a multiport cache. Therefore, multiple processes, which could be processors, tasks, or threads can access the cache during any cycle. Moreover, the ways of the cache can be allocated to the different processes and then dynamically reallocated based on performance. Most preferably, a relational cache miss percentage is used to reallocate the ways, but other system metrics may also be used.

The foregoing and other features and advantages of the present invention will be apparent from the following more particular description of the preferred embodiment of the invention, as illustrated in the accompanying drawings.

BEST MODE(S) FOR CARRYING OUT THE INVENTION

The preferred embodiments of the present invention provide a performance based system and method for dynamic allocation of a unified multiport cache. A multiport cache system is disclosed that allows multiple single-cycle look ups through a multiport tag and multiple single-cycle cache accesses from a multiport cache. Therefore, multiple processes, which could be processors, tasks, or threads can access the cache during any cycle. Moreover, the ways of the cache can be allocated to the different processes and then dynamically reallocated based on performance. Most preferably, a relational cache miss percentage is used to reallocate the ways, but other system metrics may also be used.

The system and method preferably determines which process could benefit the most if additional cache space was allocated to the process or could benefit a computer system the most if additional cache space was allocated to the process. The system and method then allocates additional ways to the process, at the expense of removing ways from other processes. The reallocation can take place periodically, thereby maximizing the performance of the system and handling unforeseen demands by processes. Because the multiport tag can look up multiple requests during one cycle, there is reduced waiting for cache access and look up by processes. Moreover, because of the multiported nature of this system and method, multiple accesses by processes are allowed during single cycles. This reduces cache access time and improves overall system performance.

Figure 1:
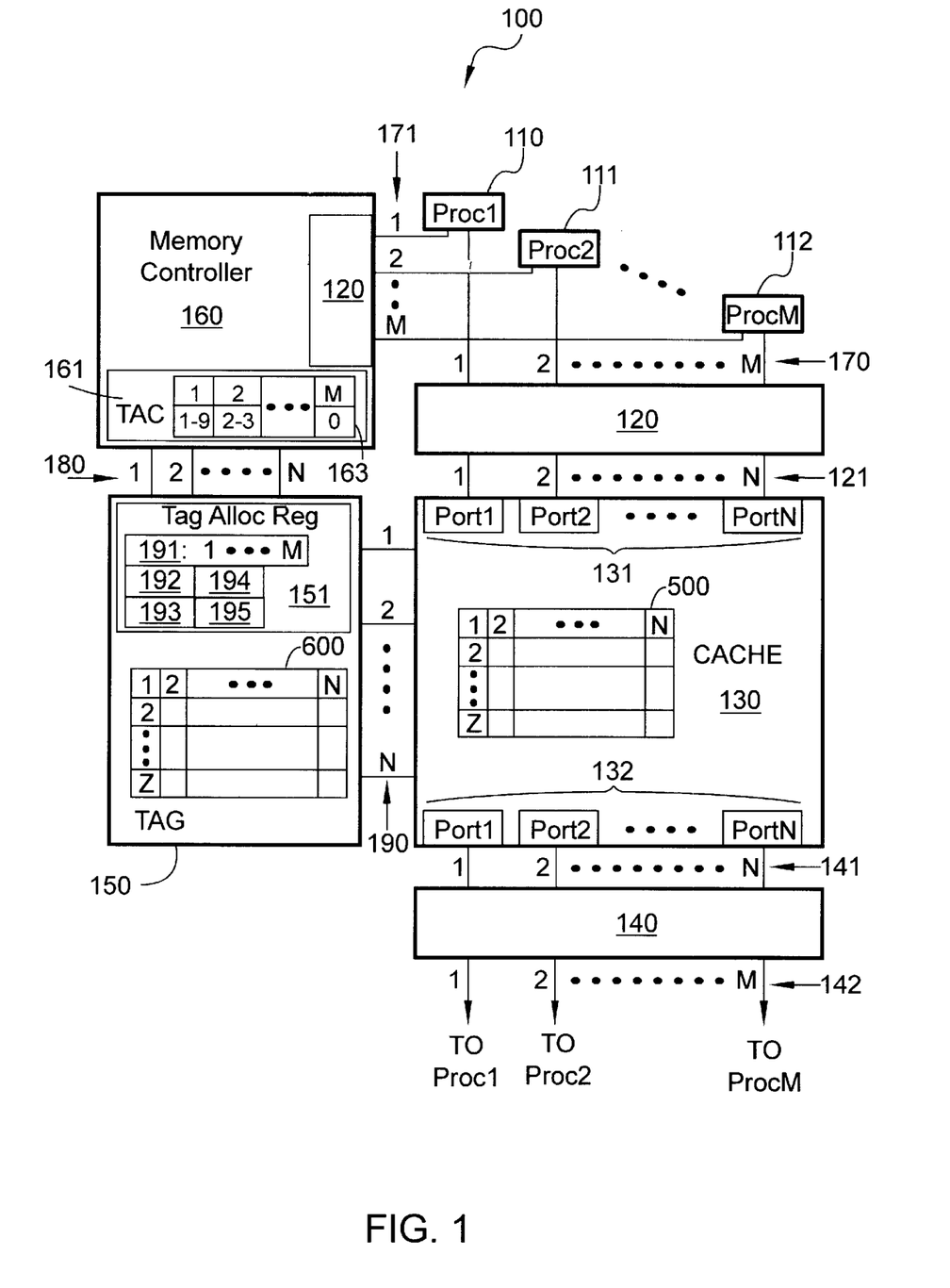
FIG. 1 is a block diagram of a multiport cache system that can dynamically allocate ways of a multiport cache in accordance with a preferred embodiment of the present invention.

Referring now to FIG. 1, a system 100 is shown that provides a multiport cache and tag structure and allows dynamic allocation of cache ways. System 100 comprises M processes 110, 111, 112, a processes-to-cache multiplexor 120, a cache-to-processes multiplexor 140, a multiport cache 130, a memory controller 160, and a tag 150. Memory controller 160 comprises a processes-to-cache multiplexor 120, N output addresses 180, and a tag allocation controller 161. Processes-to-cache multiplexor 120 in memory controller 160 has N outputs (not shown) that are routed to the N addresses 180. Processes 110, 111, 112 can be individual processors that access the memory controller and cache through buses 170, 171 or can be tasks that are running on one processor and accessing the memory controller and cache through buses 170, 171. These processes communicate the address of the data to the memory controller through bus 171, write data through bus 170, and read data through bus 142.

Tag 150 comprises a tag memory 600, a tag allocation register 151, and N hit/miss indications 190. The N hit/miss indications 190 are coupled to the cache 130 and serve to inform the cache or process of a hit or miss. Tag allocation register 151 has space reserved to track system metrics 191, elapsed cycles 192, a cache evaluation period 193, a cache miss percentage 194, and a cache reallocation factor 195. Additionally, other information may be tracked and variables added to best allocate the cache ways on a per process basis. System metrics 191 in this example and most preferably would contain M variables, one for each process. Each variable would contain the number of misses for each process. For example, if process 110 missed 100 times, then "100" would be stored in one of the variables in system metrics 191. Alternatively, other system metrics, such as overall system performance, may be stored in system metrics 191. Elapsed cycles 192 is used to determine the number of cycles that have elapsed since the last evaluation of system performance. Cache evaluation period 193 determines when the system's performance should be re-evaluated. If the elapsed cycles 192 is larger than (or equal to) cache evaluation period 193, then the system performance should be evaluated and the ways of the cache reassigned to the processes.

Cache miss percentage 194 is a factor used to determine if the cache should be reallocated. The total misses for all of the process are compared to the cache miss percentage to determine if there are too many misses. The cache miss percentage 194 thus reduces the number of times the cache is reallocated. The cache miss percentage 194 is optional, but preferred. The cache reallocation factor 195 is a factor used to reallocate the cache, and it determines what percentage of the cache will be reallocated to a task. This factor will generally be a certain number of ways of the cache or a certain percentage of the cache.

Memory controller 160 comprises a tag allocation controller mechanism 161 that allocates the cache based on system performance. Tag allocation controller 161 comprises a way assignment memory 163. Way assignment memory 163 contains data that indicates which process is assigned which way. Most preferably, cache memory 500 is assigned on a way-by-way basis and not a line-by-line basis. In other words, each of the processes will be assigned to zero, one, or more ways and will be allowed to write to its way. All lines in a way would be assigned to one or more processes. In the example of FIG. 1, way assignment memory 163 comprises M entries (indicated by 1, 2, . . . , M in the figure). Each of these entries contains the way mapping for each process. For instance, process 1 is mapped to ways 1 and 9, process 2 is mapped to ways 2 and 3, and process M is mapped to zero ways. Preferably, there are less processes than there are ways and each process is assigned at least one way. However, if there are processes that need a large amount of cache space, the tag allocation controller 161 can increase the number of ways allocated to these processes. There may be times when another, rarely-used or idle process would not have any ways allocated to it. This is the situation shown in FIG. 1. In general, each process will have at least one way assigned to it.

Another mechanism that may be used to assign ways to lower priority or idle processes is to assign more than one process to a way. For instance, both process 1 and 2 could be assigned to way 1. Either process could write to any line in the way. Alternatively, it is possible to assign certain lines of the way to each process. For example, lines 1–50 could be assigned to process 1 while lines 51–100 could be assigned to way 2. However, this could make the memory-to-cache mapping quite complex, and thus is not preferred.

Tag allocation controller 161 uses information from tag allocation register 151 to determine when to reallocate the cache. Retrieval by the tag allocation controller 161 of information from the tag allocation register 151 can be done by any method known to those skilled in the art, such as addressable registers, hard-wired signals, etc. Additionally, tag allocation controller 161 will use this information to determine which process should receive the most amount of ways of the cache. Most preferably, the allocation of the cache is determined from cache misses: the process with the most cache misses will receive the highest cache allocation. Alternatively, other system metrics may be used to determine cache allocation.

Memory controller 160 communicates the address (or a portion of the address) to the tag 150 through bus 180. Each of the N ports of bus 180 also preferably contains data that indicates which process is accessing a port. For instance, if process 112 is reading from port 3, the fact that process 112 (and not the other M-1 processes) is accessing this port is communicated to the tag 150 through bus 180. The tag 150 uses the process information during a read to determine if the data being requested is in the cache. For example, if process 112 is reading from the cache, the tag 150 not only should know the address of the data but should also know which processor is requesting the data, as there could be multiple data per line having the same address but from different processes. The tag 150 uses the process information (called a process identification in reference to FIG. 7) to perform cache look ups.

Cache 130 comprises N write ports 131, N read ports 132, and cache memory 500. There are N ways in memory 500 and Z lines in the cache. Each of the N write ports 131 can write to any way of the cache. Similarly, each of the N read ports 132 can read from any way of the cache. Processes-to-cache multiplexor 120 essentially arbitrates and multiplexes the M processes to the N ports 121 of the cache. The arbitration occurs because only one process may have access to one port at one time. The multiplexing occurs because there are M processors and N ports, with M generally larger than N. Processes-to-cache multiplexor 120 is essentially N M-to-N multiplexors that also have arbitration control. Cache-to-processes multiplexor 140 is essentially N N-to-M multiplexors, and operates in reverse of the processes-to-cache multiplexor 120. Each of the multiplexors 120, 140 may be part of cache 130, which is preferred, or may be separate from cache 130, as shown in FIG. 1 but is less preferred.

Figure 2:
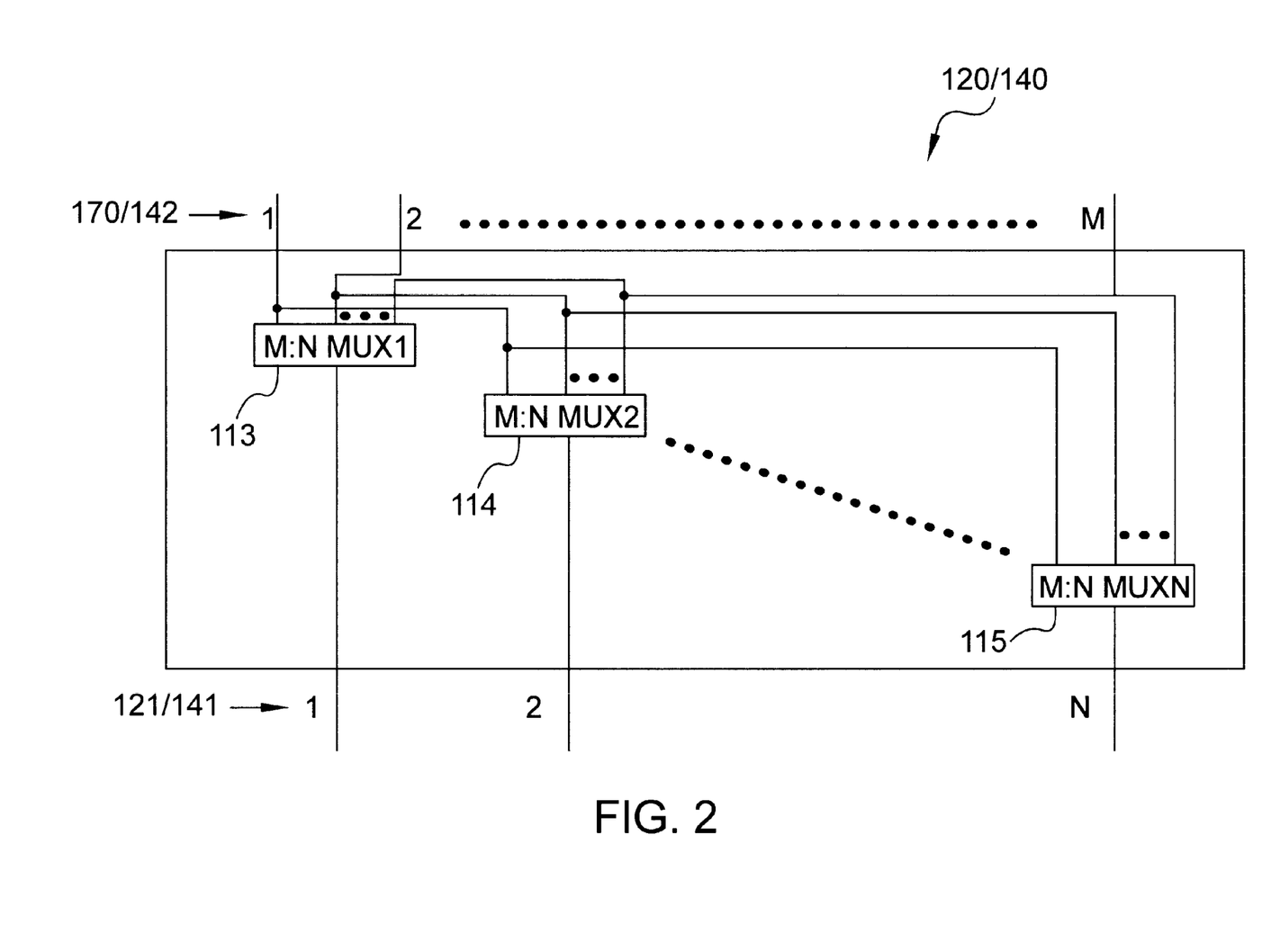
FIG. 2 is a processes-to-cache (or cache-to-processes) multiplexor in accordance with a preferred embodiment of the present invention.

Turning to FIG. 2 in addition to FIG. 1, a processes-to-cache multiplexor 120 is shown. Moreover, this figure also shows a cache-to-processes multiplexor 140, which operates essentially in reverse of processes-to cache multiplexor 120. Processes-to-cache multiplexor 120 comprises N M-to-N multiplexors 113, 114, and 115. Input data from M processes 110, 111, 112 come through data bus 170 and each multiplexor 113, 114, 115 is connected to each input of bus 170. Each multiplexor arbitrates the contest for its port. For instance, multiplexor 113 will determine which of the M processes 110, 111, 112 will have access to its port. This arbitration may be controlled by the system 100 or be entirely within each multiplexor. Such arbitration methods are well known to those skilled in the art. Thus, a processes-to-cache multiplexor 120 arbitrates the N write ports 121 amongst M inputs from bus 170.

Cache-to-processes multiplexor 140 serves a similar function, only in reverse. For instance, the N read ports 141 are directed to the M output ports 142. Each multiplexor 113, 114, 115 in this configuration must be able to determine which of the M processes should receive the cache results from its port. Again, arbitration my be involved to determine which process of the M processes 110, 111, and 112 should be able to read from the cache. This arbitration may be entirely contained within the multiplexor 113, 114, and 115, or it could be controlled by system 100.

Turning to FIG. 1 again, tag memory 600 contains one line for each line of the cache memory 500. For each line in tag memory 600, there is one entry in the tag memory 600 for each way in cache memory 500. The entries in the tag are described in more detail in additional figures, but a small introduction is appropriate here. The entries in the tag allow the ways to be mapped to particular processes 110 through 112. For instance if way 1 is assigned to process 110, then the tag will indicate this assignment. By indicating which way is assigned to which process, the tag memory 600 allows the tag allocation controller 161 to reassign the ways.

As is known in the art, there are different methods for accessing the cache. In general, the cache can be accessed either in a serial or a parallel manner. Serial accesses to the cache involve accessing the tag to perform a tag lookup and then accessing the cache, if the information is in the cache, or accessing the main memory, if the information is not in the cache. In the parallel accessing system, all the ways of the cache are being looked up at the same time, although all or none of them may be valid. If there is valid data in the cache, the process then is allowed access to the data. If the data is invalid for any reason, the memory controller is informed of the cache miss and the memory controller then proceeds to access main memory to retrieve the data. Any type of accessing scheme is appropriate for use with the present invention.

Tag allocation controller 161 periodically evaluates system 100's performance and then reallocates ways of the cache to the processes that would be best suited to have more cache memory. Most preferably, this is performed through reference to the number of misses per process, with the process having the highest number of misses receiving the most allocation of the cache. Alternatively, other system metrics may be used to determine cache allocation. In particular, the operating system of system 100 could determine an overall system performance metric and use this metric to adjust the cache allocation. For example, if the system performance is lowered by assigning more cache to one of the processes, the operating system can determine this fact and assign less cache allocation to this particular process. Any method for determining the allocation of the cache may be used with the current invention.

The most preferred method for determining cache allocation is by determining the process that has the most cache misses over a predetermined time period. This method is preferred because it is simple to implement and will usually provide a high amount of system performance. In general, assigning the largest amount of cache to the process with the most cache misses will result in lower overall misses and an increase in system performance. Thus, the cache miss metric will be the metric discussed herein that is used to allocate the ways of the cache, although other metrics may be used.

Figure 5:
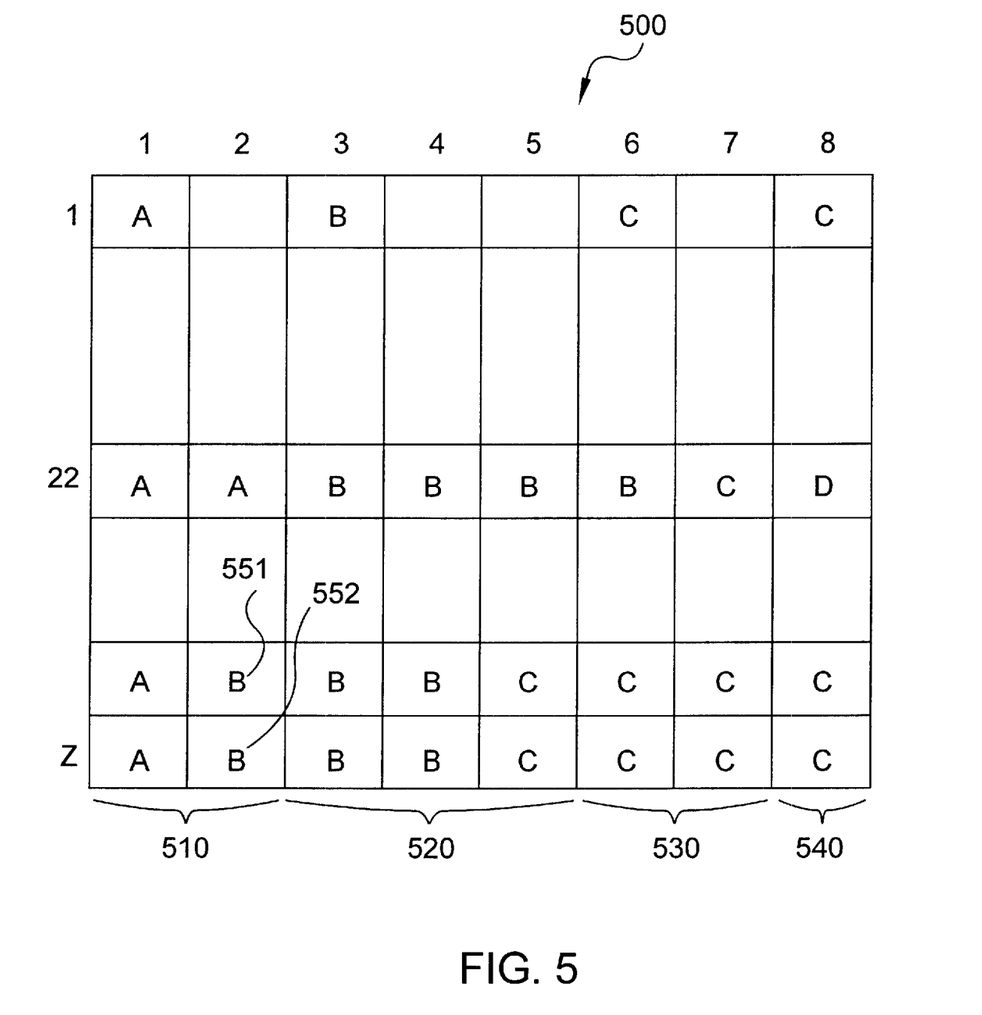
FIG. 5 is an example of a multiport cache memory in accordance with a preferred embodiment of the present invention.

Referring now to FIG. 5 in addition to FIG. 1, FIG. 5 shows an exemplary cache memory 500. Cache memory 500 is an eight-way memory. There are Z cache lines, and each cache line has eight ways. The ways are currently divided such that process A is assigned two ways 510, process B is assigned three ways 520, process C is assigned two ways 520, and process D is assigned one way 540. In this exemplary system, there are four processes 110 through 112, which are processors.

In this system, a process may be allocated a particular proportion of the cache. However, until the process writes to the cache, data from other processes may reside in the ways assigned to this process. For example, process A is assigned ways 510. Process B currently has information in locations 551 and 552. Until process A writes over these data, process B will be able to read this data. However, process B will not be able to write data to these locations.

Figure 6:
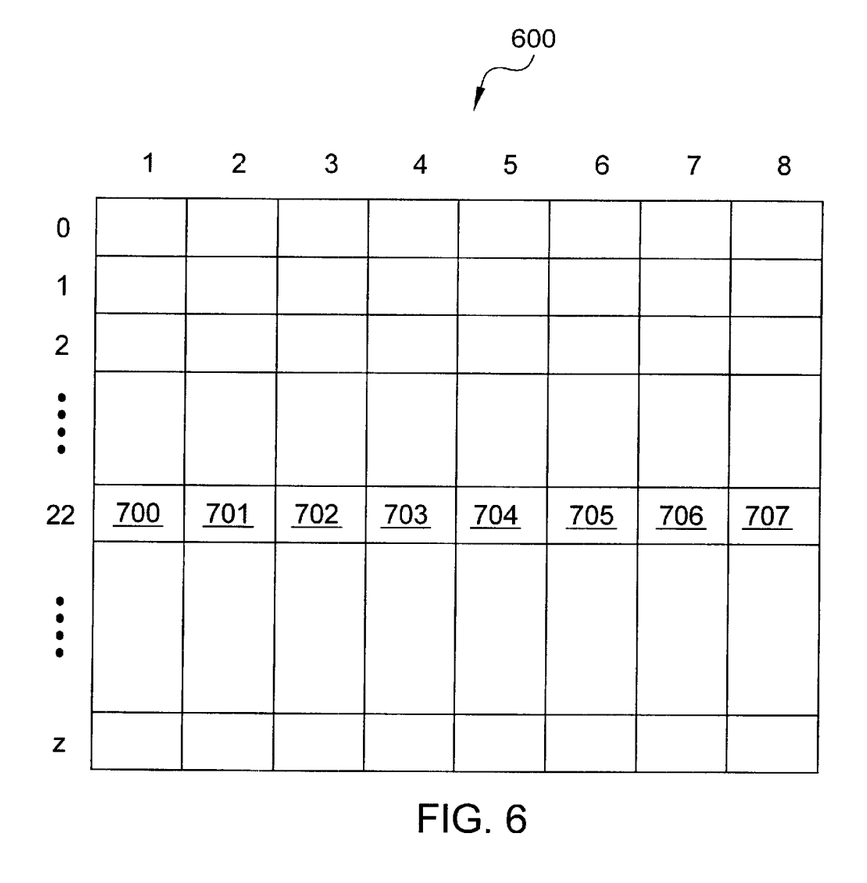
FIG. 6 is an example of a multiport tag memory in accordance with a preferred embodiment of the present invention.
Figure 7:
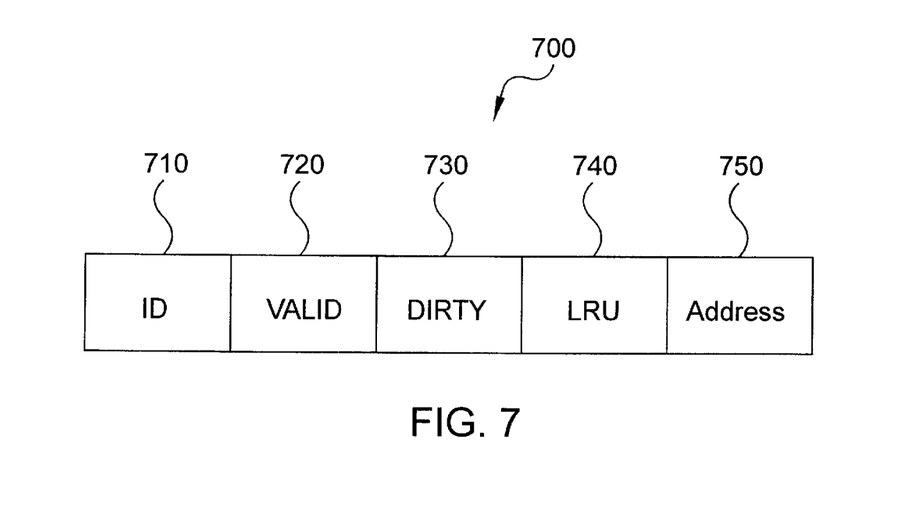
FIG. 7 is an example of an entry in a multiport tag in accordance with a preferred embodiment of the present invention.

Turning now to FIGS. 6 and 7 in addition to FIG. 1, FIG. 6 shows an exemplary tag memory 600 and FIG. 7 shows an exemplary entry 700 in the tag memory 600. Tag memory 600 comprises a number of entries and lines. There are the same number of lines in tag memory 600 as there are in cache memory 500. Each line of tag memory 600 thus corresponds to one line of cache memory 500. There are a number of entries per line in the tag memory 600. Preferably, there is one entry in each line per way of cache memory 500. For instance, the cache memory 500 of FIG. 5 has eight ways; therefore, each line of tag memory 500 comprises eight tag entries, one for each way. This is indicated in FIG. 6 on line 22, where there are eight entries 700 through 707.

An exemplary tag entry 700 is shown in FIG. 7. For each way in cache memory 500, there will preferably be one entry 700. Entry 700 comprises a process identification (ID) 710, a valid indication 720, a dirty indication 730, a Least Recently Used (LRU) indication 740, and a tag address 750. The ID 710 contains data that indicates which of the M processes is assigned to this particular way and this line. Once a particular process is assigned a way of a line, no other process can write to that way of that line. Another process can read from the way of the line, if the line contains data for this other process. Moreover, the process ID 710 allows the tag 150 to determine if a particular way of a line in the cache memory 500 belongs to a process. The valid indication 720 is generally a bit, and is used to determine whether the way of the line is valid. The dirty indication 730 is also usually a bit, and it is used to mark the way of the line as "dirty", meaning that the cache contains a more recent version of the data. This version should be written back to main memory in accordance with cache coherence protocols.

The LRU information 740 is used to determine which way has the oldest data in it. In general, the oldest information for a process is replaced with the newest information from a process. This is explained in greater detail below. LRU information 740 could be any information that can be used to determine which data is the most recently added and which is the least recently added, such as linear number 0, 1, 2, etc. Address 750 is preferably the top-most portion of the address. Because each way of each line of the cache maps to particular addresses, only the uppermost bits of the address need to be kept to determine to which real address the way is mapped. The number of bits used is a function of the size of the main memory and the cache.

Figure 3:
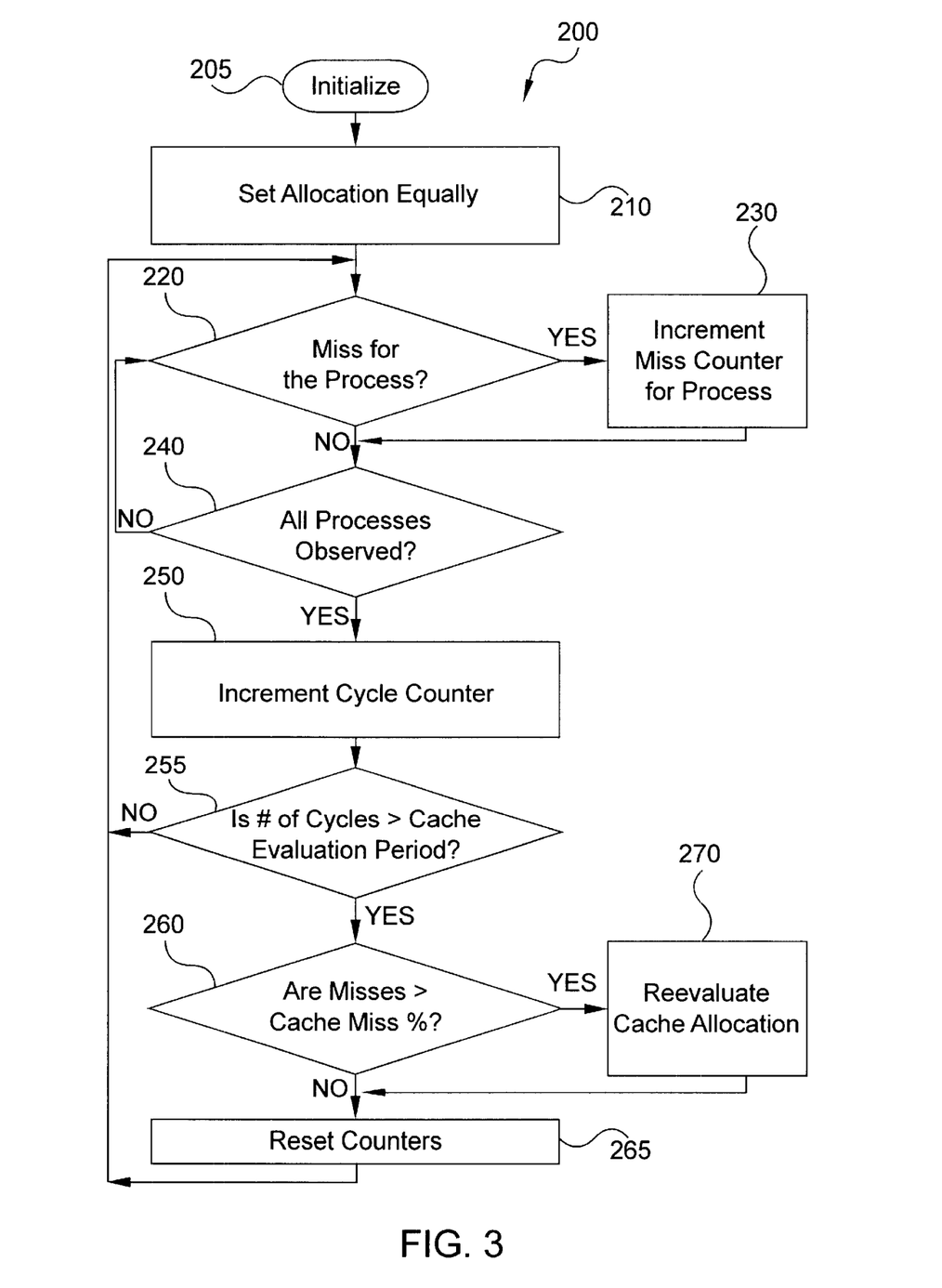
FIGS. 3 and 4 are part of one method for dynamically allocating ways of a multiport cache in accordance with a preferred embodiment of the present invention.
Figure 4:
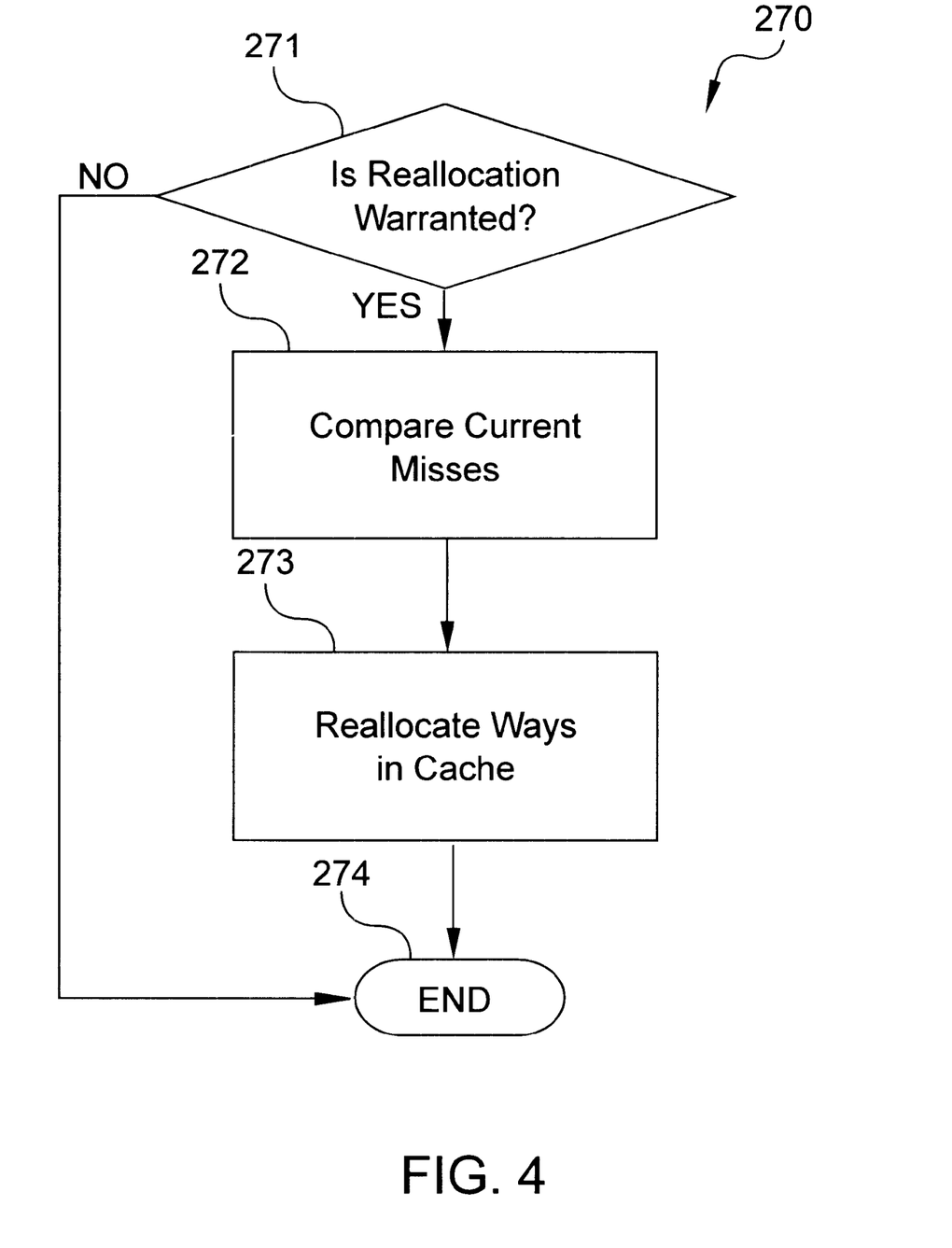
Figure 8:
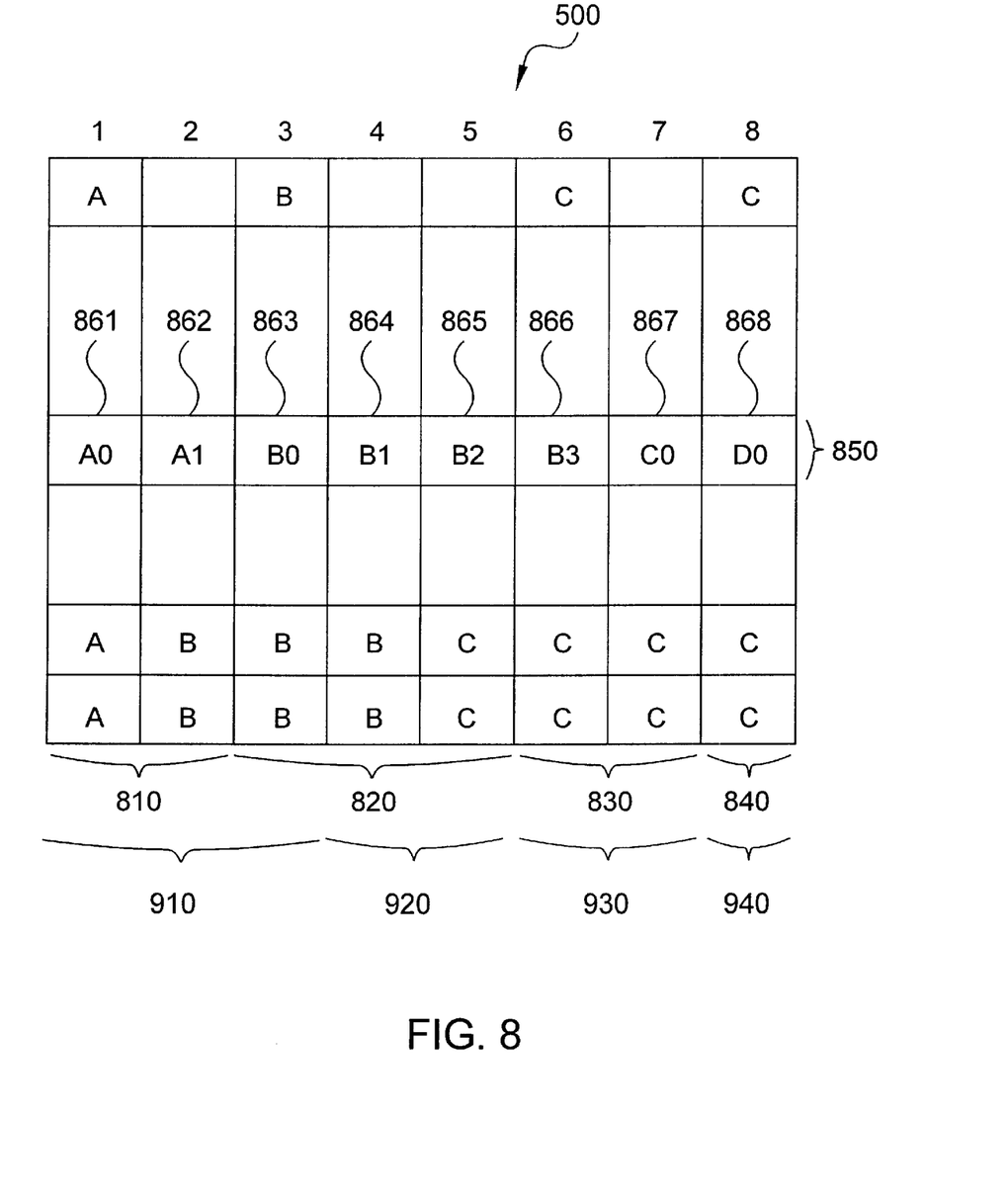
FIGS. 8 through 10 are examples of a multiport cache memory in accordance with a preferred embodiment of the present invention.
Figure 9:
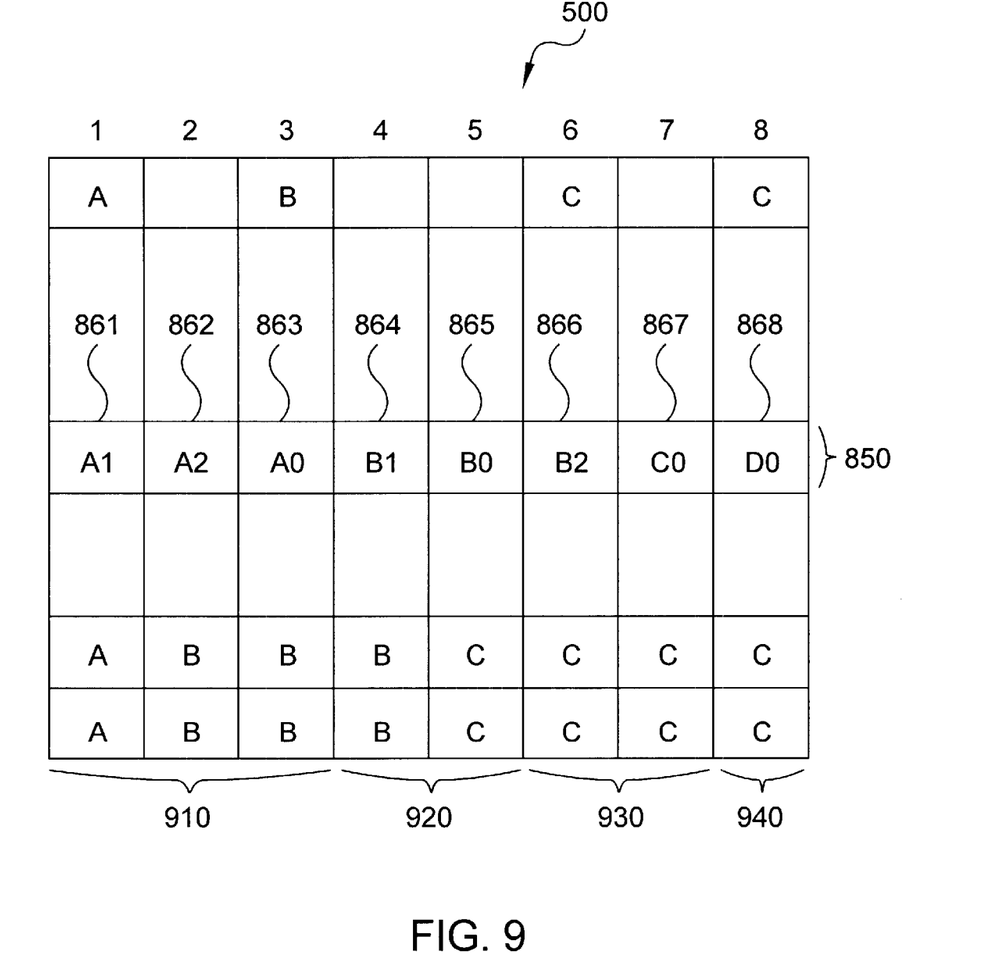
Figure 10:
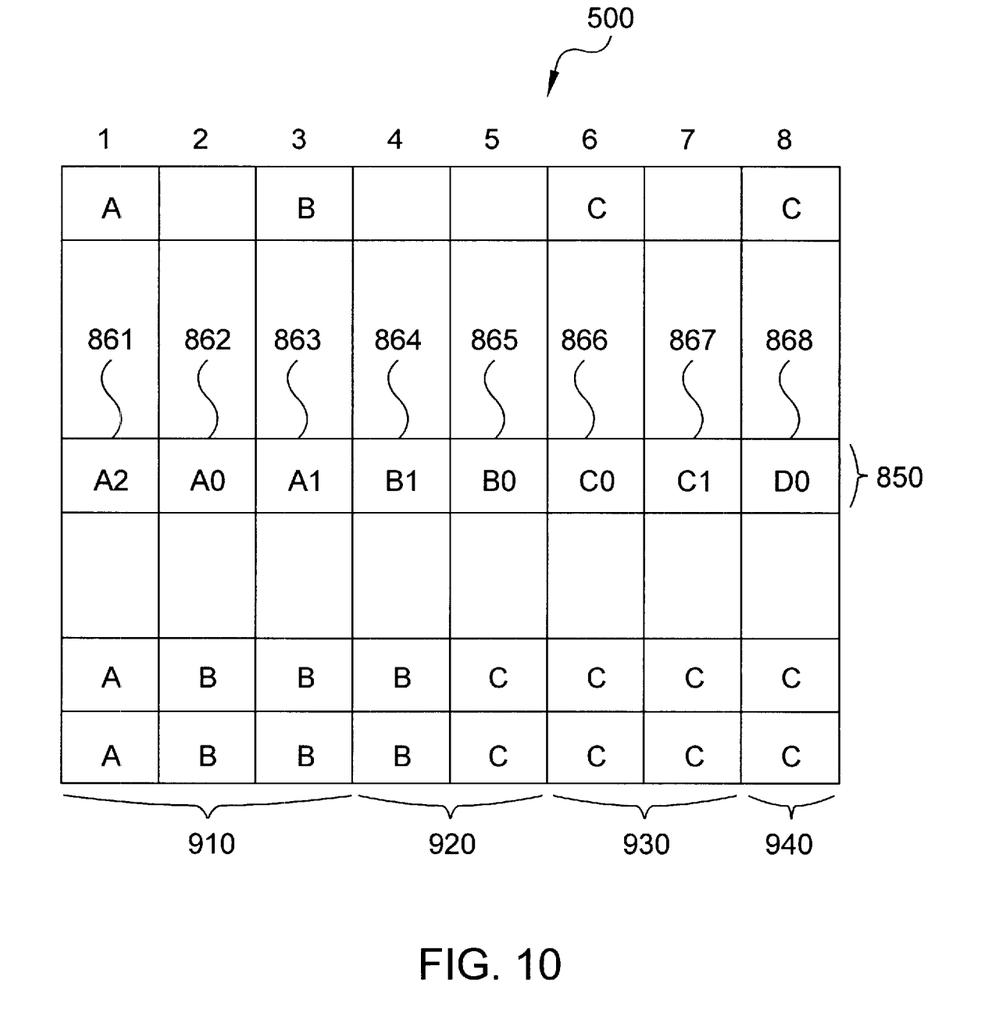

Turning now to FIGS. 3 and 4 in addition to FIG. 1, FIGS. 3 and 4 outline a method for dynamically allocating ways of a multiport cache in accordance with a preferred embodiment of the present invention. Method 200 of FIG. 3 is used by a tag allocation controller 161 to periodically allocate the cache amongst a number of processes, and based on a system metric 191 of performance. In method 200, the system metric 191 is preferably M variables, one for each process, that track the number of cache misses for each process. In the examples of FIGS. 8 through 10, it will be assumed that there are 4 processes, although the methods of FIGS. 3 and 4 will discuss two processes for simplicity. Basically, the methods of FIGS. 3 and 4 keeps track of the system metric 191 while waiting for a certain time. After this waiting period, the system 100 will determine, for the most preferred system metric, the cache miss ratios for each of the processes 110 through 112. Using these ratios, the tag allocation controller 161 performs the methods of FIGS. 3 and 4 to reallocate the cache. The system reallocates the cache based on the system metric.

Method 200 begins in step 205, when the tag allocation controller 161 initializes. This could include checking the tag memory 150 for errors, zeroing any variables (such as variables 191, 192, 193), etc. In step 210, the tag allocation controller 161 allocates the ways of the cache equally to the various processes. Because, at initialization, there is no performance data, the system 100 preferably simply assumes that each process will have the same needs for the ways of the cache. Alternatively, it could be known from the outset that particular processes will need more space in the cache. For example, in certain digital processing systems, particular algorithms will always be run that need a lot of cache allocation. In these systems, these cache-intensive processes may be assigned an initial number of cache ways that are relatively high. Moreover, if desired these processes may be allocated a minimum number of ways. In the following method, however, it will be assumed that each process starts initially with approximately the same number of ways.

Turning to FIG. 8 in addition to FIGS. 1, 3, and 4, FIG. 8 shows an exemplary cache memory 500 at some point after method 200 has run several times. At this point, cache memory 500 has ways 810 assigned to process A, ways 820 assigned to process B, ways 830 assigned to process C, and ways 840 assigned to process 840. Way assignment memory 163 would contain this information in its entries. Line 850 of cache memory 500 has 8 ways 861, 862, 863, 864, 865, 866, 867, and 868. Currently, location 861 has the most recent data from process A of ways 810; location 863 has the most recent data from process B of ways 820; location 830 has the most recent data of process C of ways 830; and location 868 has the most recent data of process D of ways 840. Note that this LRU information is on a line-by-line and process-by-process basis, which means that the LRU information states the order of entry of data per line but also keeps track of the order of entry of data per process.

Steps 220 through 250 occur in one cache cycle. In step 220 of method 200, the tag allocation controller 161 determines if there has been a miss for this cycle for a process, such as process A. If so, the counter (in system metric 191) is incremented (step 230) to show this miss. The tag allocation controller 161 then cycles through each process (step 240) until it has updated the necessary counters of misses for each process. Thus, using FIG. 8 as an example, if each process experiences a cache miss for a particular cycle, the tag allocation controller 161 will increment each of the four variables for each process. In step 250, the cycle counter 192 is incremented.

In step 255, the tag allocation controller 161 determines if the number of cycles in cycle counter 192 is at least as great or greater than the cache evaluation period 193, which is the time in cycles that is programmed to start the evaluation process. This cache evaluation period should be set to a value such that momentary bursts of cache activity do not cause the method to oscillate. If the cache evaluation period is set too low, the method might try to reallocate the cache so often that it degrades the performance of the system more than it improves it. If the cache evaluation period is set too high, a processor might get starved out. A value of around 10000 cycles is suggested.

When the cache evaluation period has completed (step 255=YES), it is first determined if the total number of cache misses is large enough to warrant a cache reallocation cycle (step 260). This is done by adding miss counters A, B, C, and D in system metric 191 and comparing the result to a cache miss percentage 195. The cache miss percentage 195 can be calculated by multiplying the expected or desired cache hit ratio for each process by the cache evaluation period and adding up the results. If the total number of misses is less than the cache miss percentage, this indicates that the current cache allocation is working and the current cache allocation should be left alone. In this event (step 260=NO), the counters are reset for the current cache cycle counter 192 and the system metric counter(s) 191 (step 265), and another cache evaluation period is started (step 220).

If the sum of the cache miss counters in system metric 191 is greater than the cache miss percentage (step 260=YES), step 270 is performed. Method 270 is shown in FIG. 4, and begins when it is decided if the difference between process cache miss counters is enough to warrant a reallocation cycle (step 271).

If, for example, there are a lot of cache misses, uniformly distributed among all the processes, then the current allocation is considered fair and no reallocation is done. Preferably, the cache is only reallocated when there is a relatively significant disparity in cache miss ratios between processes. Because of this, each cache miss counter for each processor in system metric 191 is compared to the others (step 22). If, for example, process A's miss counter is larger than processor B's miss counter by a pre-determined cache reallocation factor 195, some ways of the cache will be assigned to processor A (step 273). Preferably, this is done by determining which process has the largest percentage of the cache and taking cache ways from this process (step 273).

Alternatively, the method could determine which process had the least misses during the current cache evaluation cycle and then take cache ways assigned to this process. For the latter method, there may be a minimum number of cache ways that will also factor into this analysis: if the method determines that the process with the lowest number of cache hits currently is assigned the minimum number of ways, the method will leave the cache allocation for this process alone.

The pre-determined cache reallocation factor is a number that indicates how much greater the misses for one process must be versus another process for the method to allocate cache ways to the first process. This factor is preferable to prevent the method from continually reassigning the ways of the cache for small differences in miss rates between the processes.

In step 273, it is possible that allocation of the cache ways may be made between many processes. In general, however, for each cache evaluation period, it is recommended that only one process be assigned additional cache ways (and one process less cache ways). This allows the next cache evaluation period to be used to determine the efficacy of the previous assignment.

This will hopefully cause the performance of process A (in the example where a portion of process B's cache allocation is given to process A) to improve without substantially degrading process B's performance. If, after following cache evaluation periods, process A miss ratios are still significantly higher than process B's, the reallocation will continue until the miss ratio disparity is reduced. Once the reallocation is completed (step 174), all the processor counters and the reallocation period counters are reset (step 265) so that a new cache evaluation period may begin (step 220).

It should be noted that there are various methods for determining which process should have its cache ways assigned to the process that needs ways. For instance, in the previous example, process A will be assigned one or more additional ways. There could be several other processes that are also assigned ways. Preferably, the process that has its ways assigned to process A would be the process that has the lowest cache miss percentage. This should provide the best increase in performance, as after reallocation process A should have a smaller cache miss percentage and the other process should have a slightly higher cache miss percentage.

However, there are situations where this system might not be used. For instance, if there is a process that has been assigned minimum cache ways and this process already is at the minimum ways and yet also has the lowest cache miss percentage, another process could be chosen to have its ways assigned to process A. Moreover, assigning the ways of the process with the lowest cache miss percentage may not provide the largest performance improvement. For instance, a process may only be assigned two ways and yet have the lowest cache miss percentage. It is possible that assigning one of two ways of this process to another process could dramatically increase this process's cache miss percentage. This increase in cache miss percentage may offset the decrease in cache miss percentage of process A, thereby decreasing system performance. Thus, other criteria, such as assigning ways from the process having the largest number of cache ways, might be used.

FIG. 8 also shows the allocation of the cache memory 500 after the method of FIGS. 3 and 4 has been performed. The allocation prior to running method 200 was as follows: location 861 has the most recent data from process A of ways 810; location 863 has the most recent data from process B of ways 820; location 830 has the most recent data of process C of ways 830; and location 868 has the most recent data of process D of ways 840.

Turning to FIGS. 6 and 7 in addition to FIGS. 8, 3, and 4, FIGS. 6 and 7 have been previously discussed. FIG. 6 is an exemplary tag memory 600, and FIG. 7 shows an entry in the tag memory. In FIG. 6, the tag line 22 corresponds to the cache line 850. The entries for tag line 22 would indicate the following for FIG. 8 prior to method 100 being executed: Entry 700's ID 710 would indicate that process A is assigned this way and the LRU 740 would indicate that the cache entry 861 in line 850 is the newest for this process; entry 701's ID 710 would indicate that process A is assigned this way and the LRU 740 would indicate that the cache entry 862 in line 850 is the oldest for this process; entry 702's ID 710 would indicate that process B is assigned this way and the LRU 740 would indicate that the cache entry 863 in line 850 is the newest for this process; entry 703's ID 710 would indicate that process B is assigned this way and the LRU 740 would indicate that the cache entry 864 in line 850 is older than the entry in 702 for this process; entry 704's ID 710 would indicate that process B is assigned this way and the LRU 740 would indicate that the cache entry 865 in line 850 is older than the entry in 703 for this process; entry 705's ID 710 would indicate that process C is assigned this way and the LRU 740 would indicate that the cache entry 866 in line 850 is older than the entry in 704 for process B; entry 706's ID 710 would indicate that process C is assigned this way and the LRU 740 would indicate that the cache entry 867 in line 850 is the newest for this process; and entry 707's ID 710 would indicate that process D is assigned this way and the LRU 740 would indicate that the cache entry 868 in line 850 is the newest for this process.

It should be noted that any write by process C to cache line 850 will result in process B's entry 866 being written over. Process B cannot write to location 866 but can read from this location. This occurs because process C is assigned this way and process C has not yet written to the way. The apparatus 100 of FIG. 1 preferably uses the rule that, if any cache way is assigned to one process, a cache way assigned this process that has another process' data will be the first overwritten way (and data) in the cache ways. This is shown in more detail below. It should also be noted that there could be changes in valid 720, dirty 730 and address 750 information for any of the tag entries 700 through 707.

When method 200 runs, in step 271, the method determines that the overall miss rate is greater than the cache miss percentage. In step 272, the method determines that process A has the highest miss rate and process A is assigned another way (step 273). The allocation after method 200 runs would be as follows: Ways 910 are assigned to process A; ways 920 are assigned to process B; ways 930 are assigned to process C; and ways 940 are assigned to process D. The tag allocation controller 161 would update the way assignment memory 163 to contain this information.

The tag 600 would be updated as follows: entry 702 would have its ID 710 changed to indicate that process A is now assigned the cache entry 863. Cache entry 863 will be the first entry, of entries 861, 862, and 863, that will be overwritten when process A writes to cache line 850.

Turning to and comparing FIGS. 8 and 9 (in addition to referring to FIGS. 6 and 7), in FIG. 9 process A wrote to cache line 850 and this information was placed into cache location 863 according to a LRU algorithm that preferentially writes over a process' data when that data is in a way assigned to a different process. In FIG. 8, the data B0 was in entry 863, but this way was assigned to process A. When process A wrote to cache line 850, the cache will write the new data to location 863 and update the LRU information 740 for tag entries 700, 701, and 702. Moreover, because B0 (FIG. 8) was overwritten, the tag will update the LUR information 740 for tag entries 703, 704, and 705. After the write by process A, entry 864 (see FIG. 8) will contain the newest information from task B, while entry 866 will contain the oldest information from task B. The LRU information 740 for tag entries 703, 704, and 705 are updated to reflect this. Thus, when ways are reallocated, the information that is in the reallocated ways and that is from other processes will be preferentially overwritten.

In FIG. 9, process B wrote to cache line 850 and this information is stored in location 865. Thus, in one cycle, both process B and process A simultaneously wrote to the same cache line The cache controller placed the newest information from process B in cache location 865 because this location contained the oldest information (see FIG. 8) from process B that was also in a way assigned to process B. In FIG. 8, it can be seen that the actual oldest information for task B is in cache location 866. However, because cache C is assigned ways 930, of which location 866 is a part, process B is not allowed to write to cache location 866. However, process B can read from cache location 866.

After the write by process B to location 865, the LRU information 740 for tag entries 703, 704, 705 is updated to reflect the status of the data for process B. This status is shown in FIG. 9. Moreover, the valid 720, dirty 730, and address 750 information for any of the tag entries 700 through 707 may be changed, if necessary.

Turning to and comparing FIGS. 9 and 10 (in addition to referring to FIGS. 6 and 7), FIG. 10 shows cache memory 500 after processes A and C write to cache line 850. Process A has written to location 862 (see FIG. 11), replacing the oldest information from process A (see FIG. 9). Meanwhile, process C has written to location 866 (see FIG. 10), replacing the information from process B (see FIG. 10). The LRU information for tag entries 700, 701, 702, 705, and 706 will be updated to reflect the LRU status of cache locations 861, 862, 863, 866, and 867, respectively. Moreover, valid 720, dirty 730, and address 750 information will also be updated for these tag entries, if necessary.

Thus, although ways are assigned to processes through dynamic reallocation, there may be times when a process is assigned to ways that contain a different process' data. In this instance, the different process' data is preferentially overwritten and the LRU treatment of these ways takes this preference into account. If the cache is a write-through cache, prior to being overwritten the data is written back to memory if the data in the cache is dirty.

It should be noted that the method of FIGS. 3 and 4 may be modified in an way necessary to maximize system performance. For instance, the method could selectively weight the miss-counters, wherein misses from process X count as more important than misses from process Y. This allows a priority system to be placed on top of the described method. Additionally, the described method could be modified slightly to accommodate threads or processes that infrequently reference the same memory locations, such as routines that are initializing large arrays or data structures. This modification could include an additional test whereby the cache allocation scheme to a given thread/process is no longer given additional cache regions if the thread/process doesn't realize further gains from the additional way allocation. In other words, if the miss rate does not decrease as additional cache ways are allocated to the thread/process, subsequent way allocations to this process will remain constant (or possibly decrease) unless the miss rate changes within threshold limits.

Thus, what has been shown is a system and method for dynamic allocation to processes of ways in a cache. By using a performance metric, the system and method determine which process would benefit from added cache ways, and the system and method then assign that process to additional ways.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Similarly, unless otherwise specified, any sequence of steps of the method indicated in the drawings or herein are given as an example of a possible sequence and not as a limitation. Many modifications and variations are possible in light of the above teaching without departing from the spirit and scope of the forthcoming claims. Finally, in the claims, unless the word "means" is combined with a function, none of the claims are to be construed as 35 USC §112 ¶ 6 claims (also known as "means-plus-function" claims).

What is claimed is:

1. A multiport cache system comprising:
    a cache having a plurality of ways each having a plurality of lines, each line having a plurality of data locations;
    a tag having a plurality of tag entries, each tag entry corresponding to one of the data locations, each tag entry having an identification indicating which one of a plurality of processes is assigned to a corresponding one of the data locations; and
    a memory controller having:
        a Tag Allocation Controller (TAC) dynamically allocating the plurality of processes to the plurality of ways, the TAC reallocating the plurality of processes to the plurality of ways based on periodic evaluations of system performance; and
        a way assignment memory having entries each defining which way is assigned to which process;
    a processes-to-cache multiplexor, coupled to a plurality of buses and to write ports of the cache, having a plurality of multiplexors each having input coupled to the buses and one output coupled to one of the write ports of the cache; and
    a cache-to-processes multiplexor, coupled to a plurality of buses to read ports of the cache, having a plurality of multiplexors each having inputs coupled to the buses and one output coupled to one of the read ports of the cache.

2. The multiport cache system of claim 1 wherein the processes-to-cache multiplexor and the cache-to-processes multiplexor are part of the cache.

3. The multiport cache system of claim 1 wherein the processes-to-cache multiplexor and the cache-to-processes multiplexor are separate from the cache.

4. A multiport cache system comprising:
    a cache having a plurality of ways, each way having a plurality of lines, each line having a plurality of data locations;
    a tag having a plurality of tag entries and a tag allocation register, each tag entry corresponding to one of the data locations and having an identification indicating which an of a plurality of processes is assigned to a corresponding data location, the tag allocation register having a plurality of cache miss numbers, an elapsed cycles, a cache evaluation period, a cache miss percentage, and a cache reallocation factor, each cache miss number corresponding to one of the processes and indicating how many misses have occurred for this one process over a time period;
    a Tag Allocation Controller (TAC) dynamically allocating the plurality of processes to the plurality of ways, the TAC reallocating the plurality of processes to the plurality of ways based on periodic evaluations of system performance.

5. A method comprising the steps of:
    providing a multiport cache having a plurality of ways and able to be accessed by a plurality of processes;
    evaluating system performance periodically for one cache miss number per process, each of the cache miss numbers having a number of misses for one of the plurality of processes;
    determining a total number of misses by adding all of the cache miss numbers during the system evaluation;
    determining if the total number of misses is greater than a cache miss percentage; and
    reallocating the plurality of processes to the plurality of ways of the multiport cache based on the number of cache misses that are greater than the cache miss percentage.

6. The method of claim 5 wherein the step of determining if the total number of misses is greater than a cache miss percentage comprises the steps of:
    determining a plurality of process cache miss percentages by determining, for each process, an expected number of cache misses over a first time period;
    multiplying each of the plurality of process cache miss percentages by a second time period to create a plurality of results; and
    adding the plurality of results to determine the cache miss percentage.

7. The method of claim 5 wherein the step of reallocating the plurality of processes to the plurality of ways further comprises the steps of:
    if the total number of misses is greater than the cache miss percentage:
        determining a highest cache miss number;
        determining a second highest cache miss number;
        determining if the highest cache miss number is larger than the second highest cache miss number by a predetermined factor; and
        if the highest cache miss number is larger than the second highest cache miss number by the predetermined factor, allocating a process that corresponds to the highest cache miss number to at least one way of the multiport cache.

8. The method of claim 7 wherein the step of allocating the process that corresponds to the highest cache miss number to at least one way of the multiport cache comprises the step of allocating the process that corresponds to the highest cache miss number to a number of ways, as determined by a cache reallocation factor.

9. The method of claim 7 wherein the step of allocating the process that corresponds to the highest cache miss number to at least one way of the multiport cache further comprises the steps of:
    determining a process that corresponds to a lowest cache miss number; and
    allocating at least one way of the multiport cache from the process that corresponds to the lowest cache miss number to the process that corresponds to the highest cache miss number.

10. The method of claim 7 wherein the step of allocating the process that corresponds to the highest cache miss number to at least one way of the multiport cache further comprises the steps of:
   determining a process that is assigned the most cache ways; and
   allocating at least one way of the multiport cache from the process that is assigned the most cache ways to the process that corresponds to the highest cache miss number.

11. A method for dynamic allocation of a unified multiport cache, the method comprising the steps of:
   providing a multiport cache having a plurality of ways and able to be accessed by a plurality of processes, each way comprising a plurality of lines, each line comprising a plurality of data locations;
   determining one cache miss number per process, each of the cache miss numbers comprising a number of misses over a predetermined time period for one of the plurality of processes; and
   allocating ways of the multiport cache based on the plurality of cache miss numbers, wherein the step of allocating ways of the multiport cache based on the plurality of cache miss numbers comprises the steps of tracking in a way memory which cache ways are assigned to which processes and updating entries in the way memory when way allocation changes.

12. The method of claim 11 wherein each process is selected from the group consisting of a task and a thread.

13. The method of claim 11 wherein the step of allocating ways of the multiport cache based on the plurality of cache miss numbers further comprises the step of allocating a larger number of cache ways to processes that have higher cache miss numbers as compared to all the cache miss numbers from all the processes.

14. The method of claim 11 wherein the step of allocating ways of the multiport cache based on the plurality of cache miss numbers further comprises the steps of:
   determining a highest cache miss number;
   determining a second highest cache miss number;
   determining if the highest cache miss number is larger than the second highest cache miss number by a predetermined factor; and
   if the highest cache miss number is larger than the second highest cache miss number by the predetermined factor, allocating at least one way of the multiport cache to a process that corresponds to the highest cache miss number.

15. The method of claim 14 wherein the step of allocating at least one way of the multiport cache to the process that corresponds to the highest cache miss number comprises the step of allocating a number of ways, as determined by a cache reallocation factor, to the process that corresponds to the highest cache miss number.

16. The method of claim 14 wherein the step of allocating at least one way of the multiport cache to the process that corresponds to the highest cache miss number further comprises the steps of:
   determining a process that corresponds to the lowest cache miss number; and
   allocating at least one way of the multiport cache from the process that corresponds to the lowest cache miss number to the process that corresponds to the highest cache miss number.

* * * * *